L. C. WETZEL.
WEIGHING SCALE.
APPLICATION FILED JUNE 21, 1907.
1,218,731.
Patented Mar. 13, 1917.
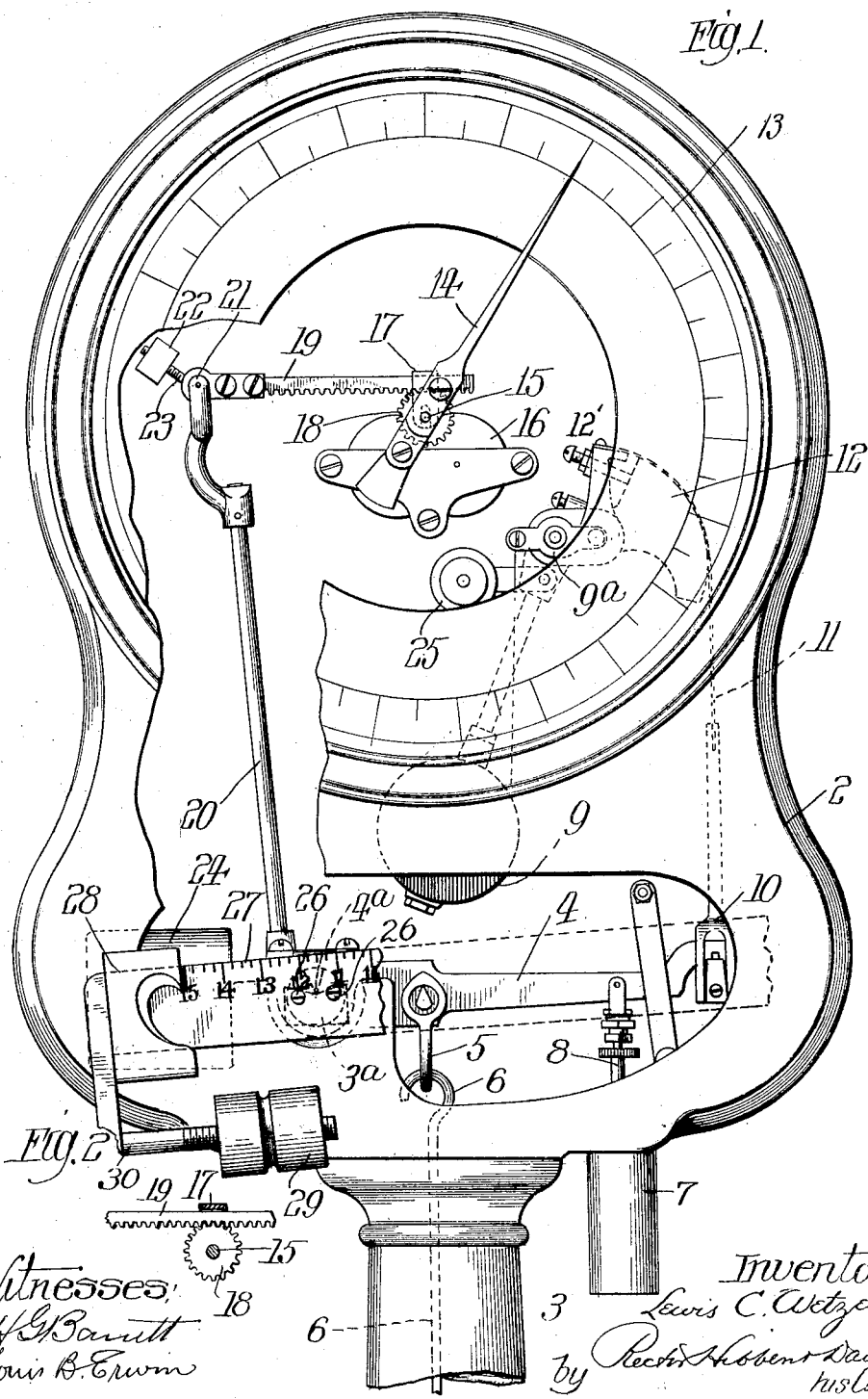

UNITED STATES PATENT OFFICE.

LEWIS C. WETZEL, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

WEIGHING-SCALE.

1,218,731. Specification of Letters Patent. Patented Mar. 13, 1917.

Application filed June 21, 1907. Serial No. 380,126.

*To all whom it may concern:*

Be it known that I, LEWIS C. WETZEL, a citizen of the United States, residing at Toledo, in the county of Lucas and State of Ohio, have invented certain new and useful Improvements in Weighing-Scales, of which the following is a specification.

The invention has reference more particularly to that type of weighing scales employing a dial and pointer for weight indicating purposes and one object of the invention is to so arrange the working parts of scales of this type that they can be compactly arranged within a casing of moderate size at the same time being allowed a range of movement sufficient to provide for all ordinary weighing operations. A further object is to so arrange the working parts of the scales that friction is rendered practically negligible, this having reference more especially to the gearing directly associated with the pointer.

With these and incidental objects in view the invention consists in certain novel features of construction and combinations of parts the essential elements whereof are recited in the appended claims and a preferred form of embodiment of which is described in detail hereinafter and illustrated in the accompanying drawings.

Of said drawings Figure 1 represents a front elevation of that portion of weighing scales of the type above indicated wherewith the present invention is concerned, the casing being partly broken away to disclose working parts within; and Fig. 2 is a detail view of the pointer gearing.

The reference numeral 2 designates an inclosing casing which may surmount a column 3 rising from a platform (not shown). Within said casing at the lower part thereof there are arranged suitable bearings 3ª for a scale-beam 4. The latter carries a clevis 5 on knife-edge bearings to one side of its fulcrum 4ª and said clevis may be connected by a rod 6 with the weighing platform or other load-carrying means. A dash-pot 7 is preferably arranged on the casing its piston connecting by a rod 8 with the scale-beam for the purpose of steadying the movements of the latter. At an upper point within the casing suitable bearings 9ª are arranged for supporting a pendulum 9. The latter is connected with one end of the scale-beam 4 in a well-known manner, the connection comprising a stirrup 10 engaged with the end of the scale-beam beyond the dash-pot, and a strap 11 connected with the stirrup and with the pendulum, said strap overlying a shoe 12 pivotally mounted on the pendulum hub and adjustably held fixed in a relation thereto by screws 12′ in a well-known manner. It will be obvious that with the parts arranged as above described the pendulum constitutes load counter-balancing means and the scale-beam will be moved different distances by different weights affecting the connecting rod 6, as regulated by the swing of the pendulum. The latter is provided ample space in which to swing by the manner of mounting it. The scale-beam occupies the lower part of the casing extending from side to side thereof and the pendulum is located above the scale-beam so as to swing from right to left as the parts are viewed in Fig. 1, *i. e.*, from that side of the casing where the stirrup 10 is located toward the opposite side in weighing.

On the front of the casing at the upper part thereof a circular dial 13 is carried and a pointer 14 is arranged to sweep over this dial, said pointer being carried by an arbor 15 supported by roller bearings 16 and suitably confined in place by a fixed bracket 17. The arbor 15 also carries a gear-wheel 18 and the latter is in mesh with a rack 19 loosely confined by the bracket 17 as shown in Fig. 2. The rack extends horizontally as shown and it will be obvious that by moving the same from side to side the pointer can be caused to sweep over the dial.

An upstanding arm 20 rigidly secured to the scale-beam 4 at or near the latter's fulcrum is pivotally connected at its upper end to said rack as shown at 21. It will thus be seen that as the scale beam swings up and down the rack will be moved horizontally. It is of the greatest importance to accurate weighing that gearing such as the rack and gear-wheel described shall operate with perfect ease and it is therefore desirable to keep the gearing in mesh under the lightest pressure. It will be noted that with the rack 19 pivotally connected to the upper end of the arm 20 and thence extending horizontally above the gear-wheel 18 the weight of the rack will tend to keep it in mesh with the gear-wheel. In order to reduce the weight to an amount just sufficient to maintain the engagement and no more a counter-balancing weight 22 is mounted upon a screw-threaded rod 23 projecting from the rack beyond its point of attachment to the arm 20 i. e., on the side of the pivot opposite that where the rack is engaged with the gear-wheel. By adjusting this counter-balancing weight just sufficient pressure and no more can be had to preserve the proper engagement between the rack and the gear-wheel. The bracket 17 will prevent the rack from being jarred out of mesh with the gear-wheel. Other counter-balancing weights employed are the ones designated 24 and 25, the former counterbalancing the scale-beam and the latter counterbalancing the pendulum shoe 12.

While it is preferred to employ as load counter-balancing means a pendulum yet the invention is not necessarily limited to this character of load counter-balancing means.

Tare can be conveniently provided for by extending the journal of the scale-beam through the front of the casing and securing upon the end of said journal, as by the screws 26, a tare-beam 27, practically coextensive with the scale-beam and carrying a sliding weight 28. A special counterbalance for this tare-beam is preferably provided in the form of a weight 29, screwing onto an underhanging arm of an angular fixture 30 secured to the left-hand end of the beam.

What I claim is:

1. In weighing scales, the combination of a horizontally disposed scale beam having an upstanding arm rigid therewith, a dial, a pointer therefor, a gear secured to the pointer to turn therewith, a rack pivotally connected to the arm on the scale beam and resting upon and engaging the gear, the rack being without support other than said arm and gear, a counterbalance for the rack to relieve the friction thereof with the gear, and load-counterbalancing means connected with the scale beam.

2. In weighing scales, the combination of a scale-beam, an upstanding arm rigid therewith, a counterbalanced rack pivotally connected with said arm and extending horizontally, a gear engaged by said rack, a pointer turning with the gear, a dial for the pointer, and load-counterbalancing means connected with the scale-beam.

3. In weighing scales, the combination of a scale-beam, a load receiver connected thereto, a pendulum connected to the beam on the same side of the fulcrum as the load receiver, an operating connection between the pendulum and scale-beam, a dial, a pointer, a gear turning with the latter, a horizontal rack engaging the gear, and an upstanding arm on the scale-beam coupled to said rack.

4. In weighing scales, the combination of a scale-beam, a pendulum, an operating connection between the pendulum and scale-beam, a dial, a pointer, a gear turning with the latter, a horizontal rack engaging the gear, counterbalancing means for said rack, and an upstanding arm on the scale-beam coupled to said rack.

5. In weighing scales, the combination of a dial, a pointer, a gear turning with the latter, a scale-beam having an upstanding arm, a rack pivotally connected with said arm and extending horizontally above the said gear in yielding engagement therewith with provisions for varying the degree of pressure, and load-counterbalancing means connected with the scale-beam.

6. In weighing scales, the combination of a dial, a pointer, a gear turning with the latter, a scale-beam having an upstanding arm, a rack pivotally connected with said arm and extending horizontally above the said gear in yielding engagement therewith, counterbalancing means for said rack, and load-counterbalancing means connected with the scale-beam.

7. In weighing scales, the combination of a dial, a pointer, a gear turning with the latter, a scale-beam having an upstanding arm, a rack pivotally connected with said arm and extending horizontally above the said gear in yielding engagement therewith, a counterbalancing weight adjustably mounted on said rack, and load-counterbalancing means connected with the scale-beam.

8. In weighing scales, the combination of an inclosing casing, a dial on the front of the same, a pointer rotatively supported in the casing and extending over the dial, a gear wheel turning with the pointer, a horizontally extending rack engaging the gear-wheel, a scale-beam fulcrumed in the casing and having an upstanding arm pivotally connected with said rack, a pendulum hung in the casing, and operating connections between the pendulum and the scale-beam.

9. In weighing scales, the combination of an inclosing casing, a dial on the front of the same, a pointer rotatively supported in the casing and extending over the dial, a gear wheel turning with the pointer, a horizontally extending rack engaging the gear-wheel, a scale-beam fulcrumed in the casing and having an upstanding arm pivotally connected with said rack, a pendulum hung in the casing, operating connections between the pendulum and the scale-beam, and a tare-beam secured to the scale-beam on the outer side of the casing.

10. In a weighing scale, a casing, a dial carried thereby, a rotatable pointer cooperating with the dial, a gear wheel turning with the pointer, a scale-beam fulcrumed below the gear, a load-counterbalancing pendulum connected with the beam, connections from the beam to a load-receiver, an upstanding arm rigid with the beam and extending upwardly to a position beside the gear, and a horizontal rack pivotally connected with said arm and meshing with the gear.

11. In a weighing scale, a casing having an opening, a main beam pivoted within the casing, means within the casing for indicating the extent of movement of said beam, a tare beam mounted on the main beam but outside said casing, a connection between the main and tare beams substantially in line with the fulcrum of the main beam.

12. In a weighing scale, a casing, a main beam mounted within the casing, an indicator within the casing connected to the main beam for indicating the extent of movement of the latter, load offsetting means mounted within the casing and connected to the main beam independently of the connection of the indicating mechanism, a tare beam arranged in front of said casing and a connection from the tare beam to the main beam extending through the front wall of the casing.

13. In a weighing scale, the combination of a dial, a pointer, a gear turning with the latter, a scale beam having oppositely extending arms, a rack connected with the scale beam on one of said arms and a load receiver and load counterbalancing pendulum connected to the other arm of said scale beam.

14. In a weighing scale, a casing having an opening therein, indicating means, a main scale beam mounted within the casing, a load-offsetting pendulum connected with the main beam adjacent one end thereof, a connection for operating the indicating means connected with the scale beam at a point distant from the connection with the load-offsetting pendulum, a tare or auxiliary beam arranged outside of the casing, and a connection from the tare beam to the main beam extending through the opening in the casing.

LEWIS C. WETZEL.

Witnesses:
M. L. THOMPSON,
ALLEN DE VILBISS, Jr.

Copies of this patent may be obtained for five cents each, by addressing the "Commissioner of Patents, Washington, D. C."